July 14, 1942.   T. K. SHERWOOD   2,289,809
REFRIGERATION
Filed July 30, 1940
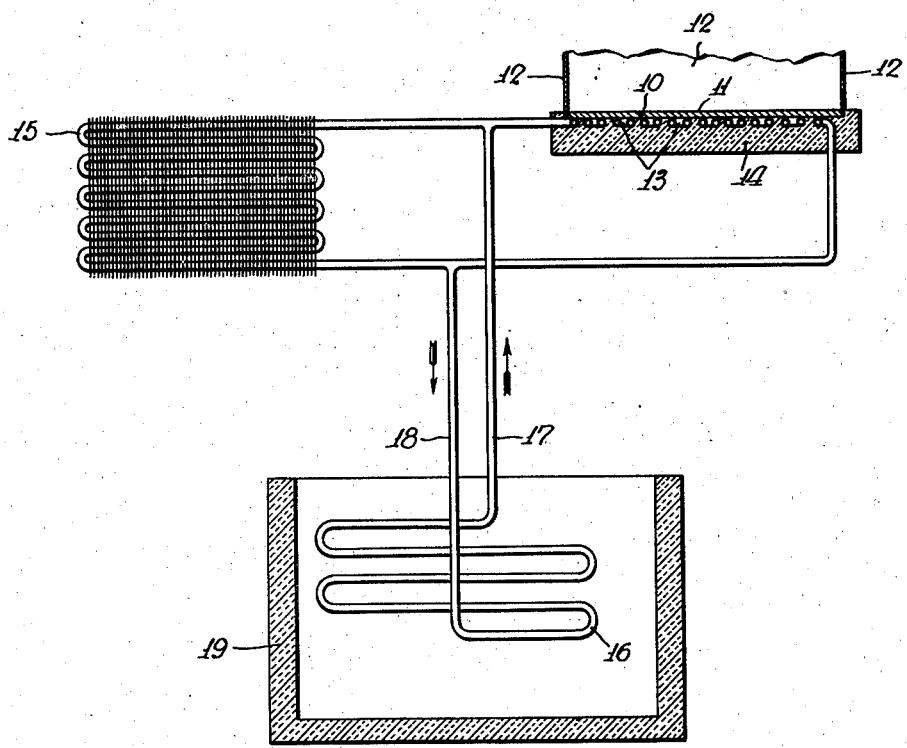
INVENTOR
Thomas K. Sherwood
BY
D. E. Heath
his ATTORNEY Patented July 14, 1942

2,289,809

UNITED STATES PATENT OFFICE 2,289,809

REFRIGERATION

Thomas K. Sherwood, Wellesley, Mass., assignor to Servel, Inc., New York, N. Y., a corporation of Delaware Application July 30, 1940, Serial No. 348,466

10 Claims. (Cl. 62—1)

At night, the atmosphere in the upper regions is colder than that in the lower regions. Therefore, on clear nights a good radiating surface will radiate strongly toward the sky and receive very little radiation in return. What is received comes for the most part from the air, which like all gases is a very poor radiator. Cloudy nights are impossible for effective radiation towards the sky, since clouds radiate toward the earth and also form a barrier against radiation toward the upper cold regions of the atmosphere.

One object of the present invention is to employ a new and improved economical method and apparatus for utilizing natural atmospheric conditions and phenomena for cooling purposes.

Another object is to provide new and improved economical method and apparatus, which utilize natural atmospheric conditions and phenomena for cooling water, and which dispense with the usual power and heating expedients commonly employed in refrigerating systems.

Another object is to provide method and apparatus, which utilize the radiating phenomena above referred to in conjunction with convection principles, to cool water either on a cool night by convection or on a clear night by radiation.

My improved method and apparatus may be employed for instance in the water-cooling systems of power plants in place of the usual cooling devices such as spray fountains or cooling towers, or may be employed to supplement the use of these devices. It may also be employed to cool water to be used directly for air-cooling purposes or for a condenser in a refrigerating system.

Various other objects of the invention will be apparent from the following particular description and from an inspection of the accompanying drawing, showing somewhat diagrammatically and partly in section an apparatus, which embodies the structural features of the invention, and which can be used to carry out the method of said invention.

For carrying out my new and improved method, a radiating member, desirably in the form of a flat metal plate 10 is horizontally mounted outdoors to expose its upper radiating surface 11 of substantial area to the sky. This surface 11 desirably has a dull black or similar coating of high radiating capacity, and is protected against air circulation by baffles 12 extending around the sides thereof.

A condenser coil 13 is disposed in good thermal contact with the bottom face of the plate 10, and is well insulated below by suitable insulation 14. A second condenser coil 15 in the form of an ordinary convection bank with finned tubing is exposed to the outside air.

The condenser coils 13 and 15 are connected in parallel to an evaporator coil 16. The evaporator coil 16 is located below the two condenser coils 13 and 15 to permit gravity flow of liquid from the condensers to the evaporator. The evaporator coil 16 is immersed in material to be cooled, such as water, held in an insulated receptacle or tank 19. The upper end of evaporator coil 16 is connected to the lower end of a conduit 17. The upper end of conduit 17 is branched and connected to the vapor inlet ends of both condensers 13 and 15. The lower end of evaporator coil 16 is connected to the lower end of a conduit 18. The upper end of conduit 18 is branched and is connected to the liquid outlet ends of both condensers 13 and 15. The condenser coils 13 and 15 and the evaporator coil 16, connected together as described, form a closed system which is partially filled with a volatile liquid.

In operation, if the air is warm but the sky is clear, the plate 10 will radiate strongly to the sky and will thereby be cooled below the air temperature. This will cause the temperature of the condenser 13 in heat exchange relationship therewith to drop below that of the water in the tank 19, so that the liquid refrigerant in the evaporator coil 16 will boil and said water will cool.

If the air is cool but the sky is overcast, the convection coil 15 will take the load, since the clouds will interfere with effective radiation from the plate 10. Under these atmospheric conditions, the temperature of the convection coil 15 will drop below that of the water in the tank 19, and the resultant boiling of the liquid refrigerant will cool the water in the tank 19.

The water tank 19 is large enough to supply refrigeration during the day by virtue of the cooling accomplished during the night.

If the atmospheric conditions are such as to maintain the temperature of the condensers 13 and 15 above the water temperature, the system ceases to function.

It should be noted that the whole system acts as a heat valve because the liquid condensed flows by gravity only in one direction indicated to the evaporator coil 16.

Although certain novel features of the invention have been shown and described and are pointed out in the annexed claims, it will be understood that various omissions, substitutions and changes in the several steps of the method and in its operation and in the form and details of the apparatus illustrated may be made by those skilled in the art without departing from the spirit of the invention.

Having thus described my invention, what I claim as new and desire to secure by Letters Patent is:

1. Cooling apparatus comprising a radiation surface exposed for radiation towards the sky and shielded against flow of ambient air in contact therewith, and conduits for conducting heat transfer fluid in a path of flow having a heat dissipating part in heat exchange relation with said surface, and a heat absorbing part in heat exchange relation with a medium to be cooled.

2. Cooling apparatus comprising conduits for conducting heat transfer fluid in a path of flow having a part in heat exchange relation with a medium to be cooled, a radiation surface arranged in heat exchange relation with another part of said path of fluid flow, said radiation surface being exposed for radiation towards the sky, and said radiation surface and conduits being thermally insulated and shielded against flow of ambient air in contact with said surface.

3. Cooling apparatus comprising a thermal conductive plate having a radiating surface exposed to the sky for radiation towards the sky, a condenser in thermal exchange relation with the other surface of said plate, a container for water to be cooled, and an evaporator in cooling relation with water in said container, and connected to said condenser wall to form therewith a circuit for volatile heat transfer fluid.

4. Cooling apparatus comprising a circuit for heat transfer fluid having a plurality of heat rejecting parts and a heat receiving part, one of said heat rejecting parts being constructed and arranged for heat transfer to a cooling fluid flowing in heat exchange relation therewith, and another of said heat rejecting parts having a radiation surface exposed for radiation towards the sky.

5. Cooling apparatus comprising a circuit for heat transfer fluid having a plurality of heat rejecting parts connected in parallel to a heat receiving part, one of said heat rejecting parts being constructed and arranged for heat transfer to a cooling fluid flowing in heat exchange relation therewith, and another of said heat rejecting parts having a radiation surface exposed for radiation towards the sky.

6. Cooling apparatus comprising a circuit for volatile heat transfer fluid having a plurality of heat rejecting parts connected in parallel to a heat receiving part, one of said heat rejecting parts being constructed and arranged for heat transfer to convection air, and another of said heat rejecting parts having a radiation surface exposed for radiation towards the sky and shielded against convection of air in contact therewith.

7. Cooling apparatus comprising a circuit for volatile heat transfer fluid having a plurality of condensers connected in parallel to an evaporator at a level below that of said condensers so that fluid condensed to liquid in the condensers flows by gravity to the evaporator, one of said condensers being constructed and arranged for cooling by convection air, and another of said condensers having a radiation surface exposed for radiation towards the sky and shielded against convection of air in contact therewith.

8. A method of cooling which comprises transferring heat from a medium to be cooled to vaporize a volatile heat transfer fluid, flowing the resulting vapor into heat transfer relation with a radiation surface exposed for radiation towards the sky, shielding said surface against movement of ambient air in contact therewith, so that when the sky is clear, said surface is cooled by radiation below the ambient temperature to cause condensation of the vaporous heat transfer fluid at a temperature and pressure lower than that obtainable by cooling with ambient air, and carrying out said vaporizing of heat transfer fluid at said lower pressure and temperature so as to cool the medium to a temperature below ambient temperature.

9. A method of cooling which comprises transferring heat from a medium to be cooled to vaporize a volatile heat transfer fluid, flowing the resulting vapor into heat exchange relation with ambient air and also in heat exchange relation with a radiation surface exposed for radiation towards the sky and shielded from ambient air, so that said vapor is condensed to liquid by heat transfer to ambient air or said surface, whichever is at the lower temperature, and again vaporizing the liquid by heat transfer from the medium to be cooled.

10. A method of cooling which comprises transferring heat from a medium to be cooled to a volatile heat transfer fluid to cause vaporization of said fluid, flowing the resulting vapor upward and into heat transfer relation with a heat receiving fluid and also a radiation surface exposed for radiation towards the sky but otherwise shielded against heat transfer, so that the vaporous heat transfer fluid is condensed to liquid by heat transfer either to said heat receiving fluid or to said surface, whichever is at the lower temperature, and returning the condensate by gravity flow into heat exchange relation with said medium to be cooled.

THOMAS K. SHERWOOD.